United States Patent [19]

Gupta et al.

[11] Patent Number: 5,557,739
[45] Date of Patent: Sep. 17, 1996

[54] COMPUTER SYSTEM WITH COMPONENT REMOVAL AND REPLACEMENT CONTROL SCHEME

[75] Inventors: Ajay Gupta, Sioux City, Iowa; Howard K. Fullmer, Pleasanton, Calif.; Michael R. Flannery, Sioux City, Iowa; Hiroshi Tanaka, Tottori, Japan

[73] Assignee: Gateway 2000, Inc., N. Sioux City, S. Dak.

[21] Appl. No.: 339,591

[22] Filed: Nov. 14, 1994

[51] Int. Cl.⁶ .................................................. G06F 13/00
[52] U.S. Cl. ........................................................ 395/183.1
[58] Field of Search ............................. 395/182.05, 183.1, 395/183.22; 364/281.9, 707, 708, 708.1, 709.09, 942.3; 439/374, 377; 369/75.1, 75.2, 246, 247, 263; 360/137

[56] References Cited

U.S. PATENT DOCUMENTS

| | | | |
|---|---|---|---|
| Re. 34,369 | 9/1993 | Darden et al. ........................... | 439/377 |
| 4,717,982 | 1/1988 | Toreson et al. ......................... | 360/137 |
| 4,754,397 | 6/1988 | Varaiya et al. .......................... | 364/200 |
| 4,937,806 | 6/1990 | Babson et al. .......................... | 369/75.1 |
| 5,021,983 | 6/1991 | Nguyen et al. .......................... | 364/707 |
| 5,107,400 | 4/1992 | Kobayashi ............................... | 361/392 |
| 5,233,594 | 8/1993 | Wilhelm .................................. | 369/75.1 |
| 5,313,596 | 5/1994 | Swindler et al. ........................ | 395/281 |
| 5,511,202 | 4/1996 | Combs et al. ........................... | 395/750 |
| 5,511,204 | 4/1996 | Crump et al. ........................... | 395/750 |

*Primary Examiner*—Robert W. Beausoliel, Jr.
*Assistant Examiner*—Stephen C. Elmore
*Attorney, Agent, or Firm*—McCutchen, Doyle, Brown & Enersen

[57] ABSTRACT

A computer system having a removable component, such as a removable hard disk drive, and an electromechanical switch that mechanically locks and releases the component. The switch also generates an electrical signal when the component is released. At this point, before the component is physically removed, the central processing unit ("CPU") of the computer executes software that causes the computer system to save what information is necessary for recovery and suspend the system. When the system resumes, the CPU determines whether the component was replaced and, if so, causes an appropriate message to be displayed. The user then may select whether to reset the system or to resume.

14 Claims, 3 Drawing Sheets

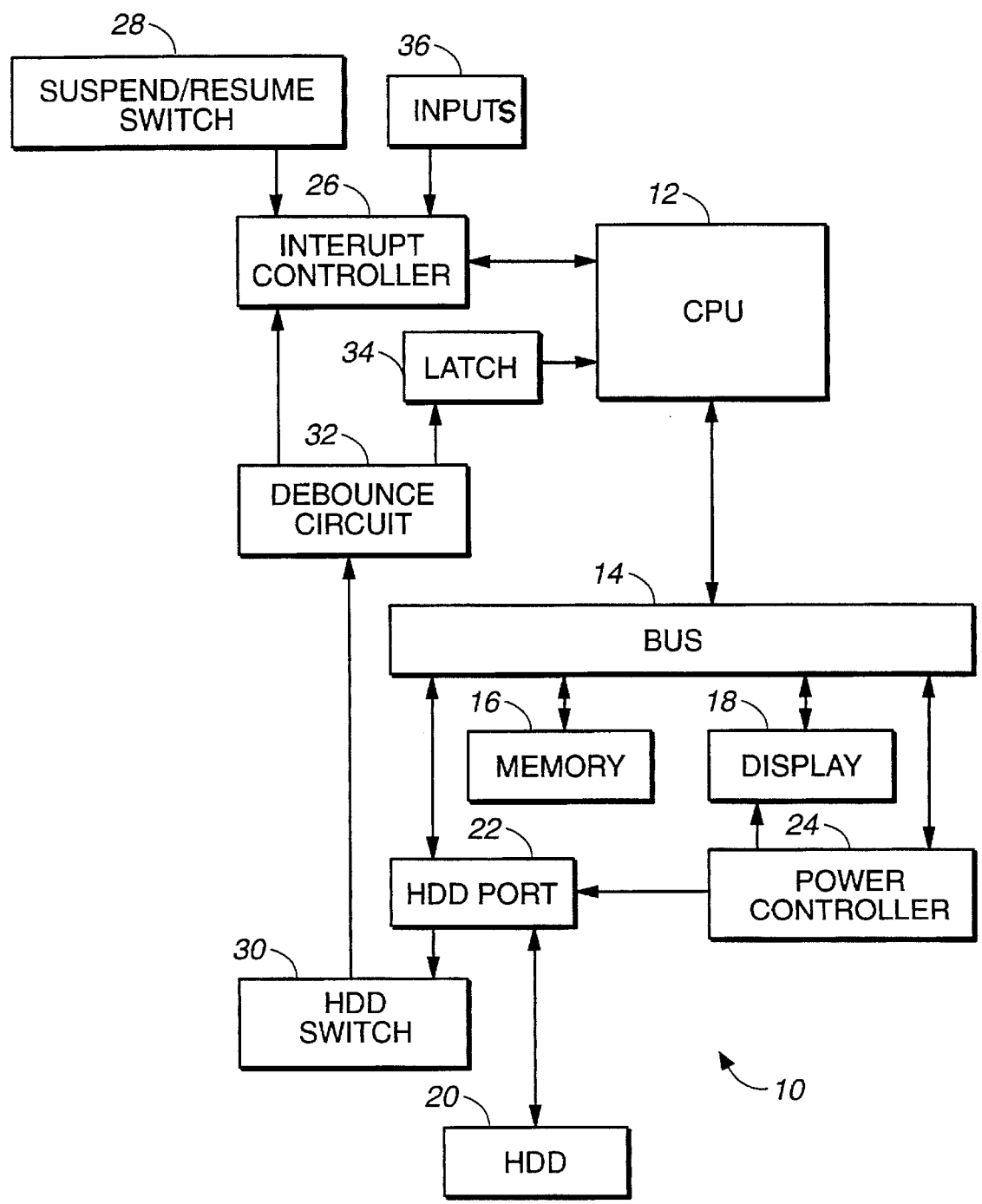
FIG._1

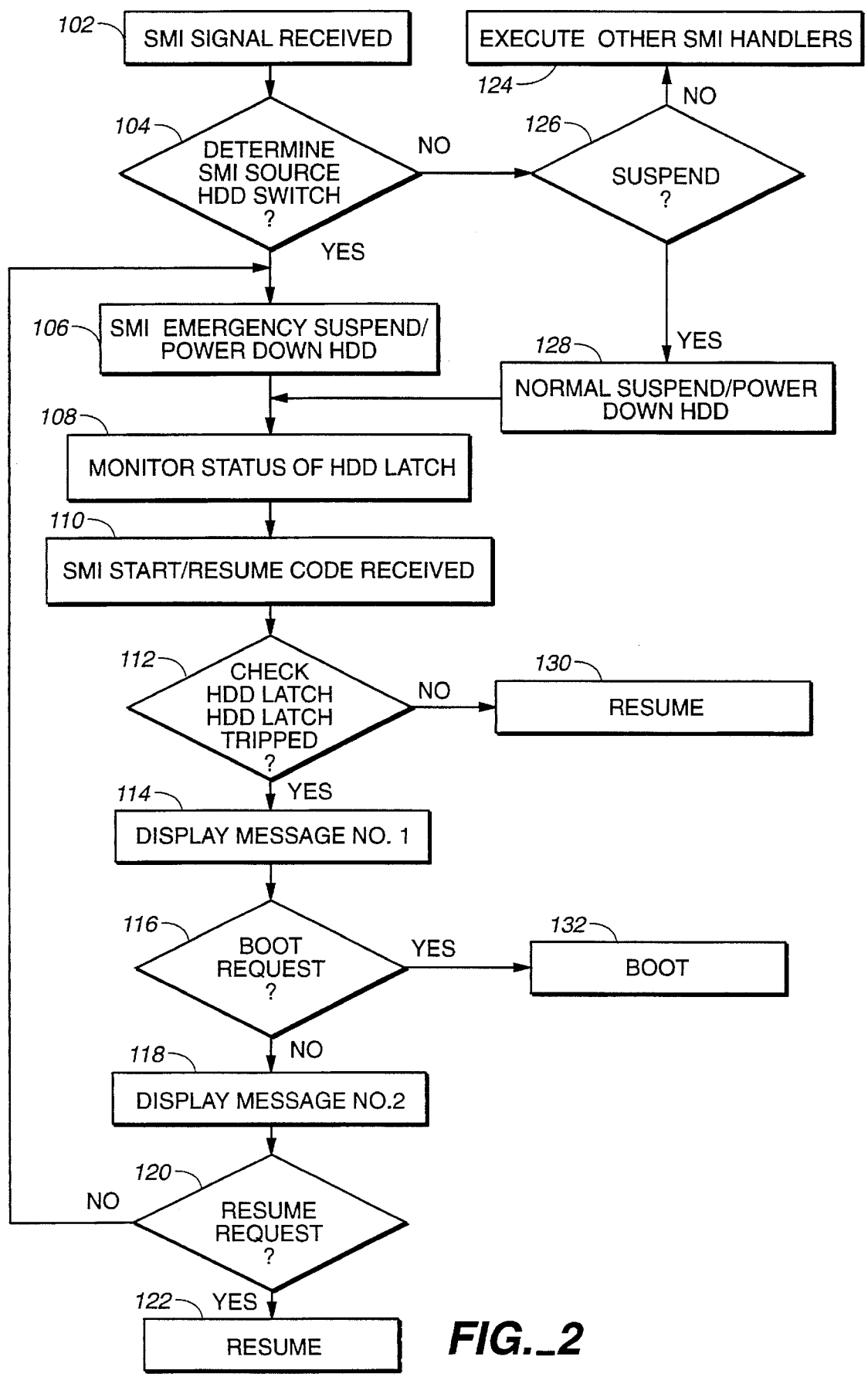
FIG._2

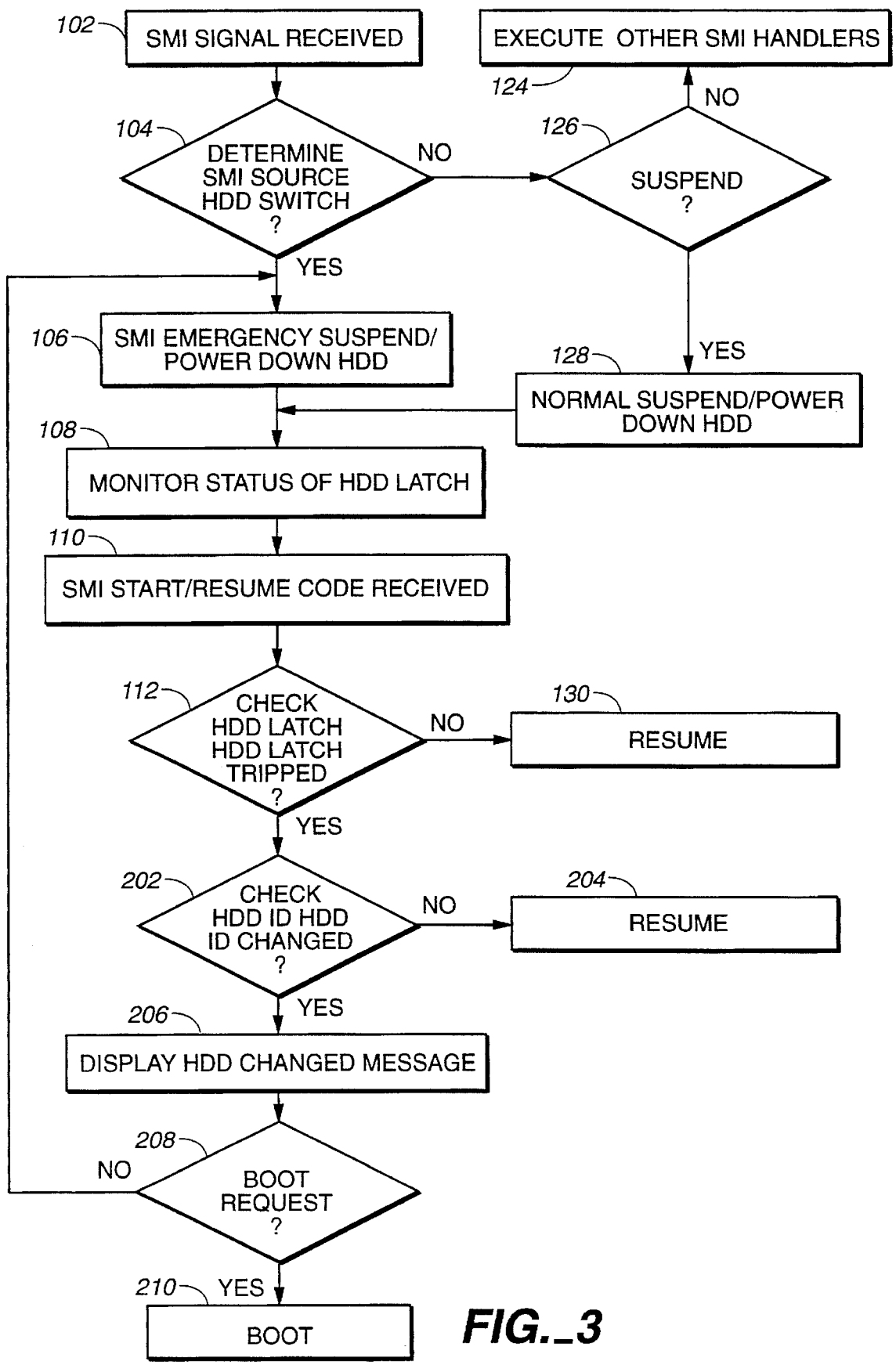
FIG._3

COMPUTER SYSTEM WITH COMPONENT REMOVAL AND REPLACEMENT CONTROL SCHEME

FIELD OF THE INVENTION

The present invention relates to computer systems having a removable component and, more particularly, to computer systems having a removable hard disk drive.

BACKGROUND OF THE INVENTION

Most conventional personal computers utilize a hard disk drive (or "HDD") as the principal means for storing frequently used software and data. A wide variety of hard disk drives are available and well known in the art. For example, hard disk drives may be internal (i.e. mounted within the computer) or external (i.e. separately packaged and connected to the computer). Many hard disk drives are also removable or detachable, allowing the disk drives (and the information stored thereon) to be exchanged between different computers or stored in secure locations when not in use.

Where a HDD is removable, it is essential that the HDD be removed and installed properly. If removal or installation of a HDD is not handled properly, a variety of problems can result. For example, if the HDD is removed or installed while the power to the computer system is on, then electrical damage may occur to the HDD and/or the computer system. If the HDD is removed while data on the HDD is being accessed, the data may be missed or permanently lost. If the HDD is changed and the computer system is not reset (or "booted") to account for the installation and the parameters of the new HDD, then serious data errors will occur. Any data that is read will be incorrect, and any data that is written will be lost. Additionally, data on the HDD will be destroyed. If the new HDD has a different operating system or environment from the previous HDD, the system can "freeze," and must thereafter be rebooted.

To avoid these problems, certain procedures ordinarily must be followed whenever a HDD is removed or replaced. The computer system should be turned off before a HDD is removed or installed. Before turning off the system, users should save any new data, and should also wait for the HDD access to be completed.

Currently, users are assumed to be familiar with these requirements for HDD removal and replacement. Relying on the user's knowledge of these procedures is undesirable, however, in that it does not account for human error. Additionally, inexperienced or infrequent users may not be familiar with HDD removal/replacement procedures.

The possibility of user error increases when the computer has one or more energy conservation modes (variously referred to by such names as "sleep", "resume", "suspend" or "standby" modes), which are used to conserve battery power when the computer is not in use. Various types of energy conservation modes are currently used. In some computer systems, when the computer is placed in an energy conservation mode, certain components (such as the display and/or the HDD) are turned off, but power is still supplied to the main random access memory ("RAM"). In such systems, data is preserved and ready to use immediately when the system is again placed in use (i.e. the system provides an "instant on" function). In other types of systems, when the computer system is placed in an energy conservation mode, the state of the system (i.e. contents of memory and various types of registers) immediately is stored in a nonvolatile memory, allowing power to be cut off from the RAM or the entirety of the system. In such systems, data must be returned to the RAM when the system is again turned on, imposing some delay prior to use. In either case, when normal operation resumes, the state immediately prior to placing the computer in energy conservation mode is restored, and the system does not reboot (i.e. reset, taking into account the parameters of various components of the system). This allows the user to continue working exactly where he or she left off. It also allows the user to begin work relatively quickly, rather than waiting for the system to perform a lengthy boot procedure.

When a computer system is in an energy conservation mode that does not involve turning off power to the entire system, the system is sometimes referred to as being suspended. When a system is suspended, it often appears to be turned off because the display is turned off. For this reason, users may erroneously assume that it is safe to change the HDD. In some types of energy conservation modes (sometimes referred to as "standby" modes), the HDD actually remains on, and removal of the HDD can result in data loss and/or electrical damage as described above. Even if the HDD is off, however, the computer will not reboot when normal operation resumes from a conventional energy conservation mode. Thus, the computer will not be aware that the HDD has been replaced and data errors will occur as described above.

Accordingly, there is a need for a computer system that allows for safe removal and replacement of HDDs even when the computer is on or in an energy conservation mode.

SUMMARY OF THE INVENTION

Broadly stated, the present invention encompasses a computer system having a removable component and a switch for securing the component to the computer system. The switch has a first state in which the component is secured to the computer system and a second state in which the component may be removed from the computer system. When the switch is switched from the first state to the second state while power to the computer system is on, the computer system becomes suspended.

In a preferred embodiment, when the system resumes, the CPU determines whether the component was replaced during the suspend mode and, if so, causes an appropriate message to be displayed to the user. The user can then select whether to reset the system, or to replace the original component and cause the system to resume.

An object of the present invention is, therefore, to provide an improved computer system.

Another object of the present invention is to provide a computer system that allows for users to safely initiate removal of a HDD while the power to the computer system is on, without causing malfunction or data loss.

Still another object of the present invention is to provide a computer system that automatically becomes suspended when a user initiates removal of a HDD while the computer system is on.

Yet another object of the present invention is to provide a computer system that prevents data loss or malfunctions caused by replacement of a HDD when the system is in an energy conservation mode.

A further object of the present invention is to provide a computer system that warns the user when a different HDD has been installed while the system is off or suspended, but resumes without data loss or user intervention when the same HDD is removed and replaced in the system.

These and other objects of the present invention will become apparent to those skilled in the art from the following detailed description of the invention and preferred embodiments, the accompanying drawings, and the appended claims.

BRIEF DESCRIPTION OF THE DRAWINGS

FIG. 1 is a block diagram of the logical structure of a computer system having a removable hard disk drive and a release switch according to the present invention.

FIG. 2 is a flow chart showing the procedures performed by one embodiment a computer system according to the present invention when a HDD is removed and when normal operation resumes.

FIG. 3 is a flow chart showing the procedures performed by a second embodiment of a computer system according to the present invention when an HDD is removed and when normal operation resumes.

DETAILED DESCRIPTION OF THE INVENTION AND PREFERRED EMBODIMENTS

The present invention encompasses a computer system having a removable component, such as a removable HDD. In a preferred embodiment, the present invention involves the incorporation of an electromechanical HDD switch at the HDD port of a computer system. The HDD switch mechanically releases the HDD from a locked position and generates an electrical signal indicating that the HDD is being removed.

The HDD switch preferably has two states. In one of the two states, the HDD is mechanically locked into position in a conventional manner. In the other state, the HDD may be physically removed. Electrically, the HDD switch generates a signal when the switch is moved from a locked to a released position. At this point, before the HDD is physically removed, the central processing unit ("CPU") of the computer executes software that causes the computer system to save what information is necessary for recovery and suspend the system so that the HDD can be safely removed.

When the system resumes, the CPU determines whether the HDD was changed and, if so, causes an appropriate message to be displayed. If the user desires to use the newly installed HDD, then the user can press a selected function key to reset the system. If the user desires to replace the original HDD, the user can press a selected function key indicating this choice. The system will be suspended and, after the user has replaced the original HDD, the system can resume. If the HDD was not changed, or the same HDD has been replaced in the system, the computer will simply resume normally.

The logical structure of an exemplary computer system according to the present invention is shown at 10 in FIG. 1. Computer system 10 comprises a central processing unit ("CPU") 12, a bus 14, a memory 16, a display 18, and a hard disk drive ("HDD") 20. Memory 16 and display 18 are also coupled to bus 14. HDD 20 is removable, and is coupled to bus 14 through an HDD port 22.

Computer system 10 further includes an HDD switch 30. Using HDD switch 30, HDD 20 may be mechanically "locked" into HDD port 22 (i.e., secured to HDD port 22 so that it cannot easily be removed) or "released" from HDD port 22 (i.e., enabled to be removed by a user). HDD switch 30 also generates an electrical signal when it is switched from a "locked" to a "released" position. This electrical signal may be generated in any conventional manner. For example, it may be produced by a momentary switch that is depressed when the mechanical switch is moved to a position allowing release of the HDD. The signal may also be generated in a conventional manner when movement of the HDD from a locked position to a released position is optically sensed. In either event, the signal that is generated passes through a conventional debounce (and conditioning) circuit 32, tripping a latch 34 and directing an interrupt controller, described below, to send an interrupt signal to CPU 12. Latch 34 preferably is tripped both when an HDD is released and when an HDD is replaced.

CPU 12 is the main computational and control unit of computer system 10, executing instructions and controlling computer system 10 in a conventional manner. CPU 12 executes a conventional basic input/output system ("BIOS") stored in a conventional manner in a read-only memory ("ROM"), which may be internal or external to CPU 12. CPU 12 communicates with memory 16, display 18, and HDD 20, as well as any other conventional peripherals or components coupled to bus 14 (such as a keyboard, mouse, or storage device), in a conventional manner utilizing bus 14.

It will be appreciated by those skilled in the art that computer system 10 also includes other elements of a conventional computer system, not directly relevant to the present invention which are not separately illustrated for the sake of clarity of the drawings. Computer system 10 may also include any other conventional component or peripheral. During operation of computer system 10, power is supplied to components of computer system 10 in a conventional manner. For the sake of clarity of the drawing, such features, which are not directly relevant to the present invention, are not separately shown in FIG. 1.

In addition to the above components, computer system 10 includes a power controller 24, which is also coupled to bus 14. Based on instructions received over bus 14 from CPU 12, power controller 24 controls the amount of power supplied to various components of computer system 10. For example, power controller 24 cuts the power supplied to display 18 and HDD port 22, thereby also cutting power to HDD 20, when computer system 10 is suspended.

Computer system 10 also includes a conventional interrupt controller 26, which preferably utilizes a conventional system management interrupt ("SMI") scheme and is used to send an interrupt signal to CPU 12 indicating that computer system 10 is to be suspended. Interrupt controller 26 is responsive to a conventional suspend/resume switch 28 that a user may press when he desires to place computer system 10 in a suspend mode in order to conserve power. In addition, interrupt controller 26 is responsive to the signal generated by HDD switch 30 and debounce and conditioning circuit 32 when HDD 20 is unlocked from HDD port 22. As explained above, HDD switch 30 preferably includes an electromechanical switch that detects, preferably mechanically or optically, when HDD 20 is mechanically unlocked from HDD port 22 and generates an electrical signal indicating HDD 20 is being removed. As explained further below, when HDD 20 is being removed from HDD port 22, CPU 22 will instruct power controller 24 to place computer system 10 in suspend mode.

In many embodiments of the present invention, in addition to being responsive to signals from suspend/resume switch 28 and HDD switch 30, interrupt controller 26 is also responsive to conventional signals received at inputs from a variety of other sources. There are many conventional sources for a suspend request, including the suspend/resume switch, a lid close switch, a dead battery indicator, a battery latch switch and a timer indicating that the system has not been in use for a predetermined time period. For the sake of clarity of the drawing, the additional sources are illustrated by one set of signal inputs 36.

When a suspend request is received, the conventional SMI suspend code checks whether any critical system activity is occurring. For this purpose, critical system activities are activities such as HDD or floppy disk drive access, or PCMCIA operations. If no such activities are in progress, then the system suspends. If a critical activity is occurring, then the system waits for a period of time for the activity to complete before suspending. After a predetermined time period, the system will suspend even if all critical system activities have not completed. Furthermore, the time that the system will wait for these activities to complete is dependent on the cause of the suspend request.

When the system suspends, power to the HDD and certain other components of the computer system is cut off. Power is still supplied to certain other components of the computer system, however, including CPU 12 and Memory 16. Thus, power to System 10 as a whole is not cut off, allowing the system to resume without booting.

Suspend request signals are divided into two groups: Normal and Emergency. When an Emergency suspend request is received, the system will wait only a very short time (preferably less than a second) for any critical activities to finish. When a normal suspend request is received the system may wait for many tens of seconds or even minutes. In some embodiments, computer system 10 uses only two different "time-out" values (i.e., the time period from receipt of a suspend request until the suspend occurs): the relatively short time period for an emergency request and a fixed, longer period for a normal request. It will be appreciated, however, that this concept may readily be expanded to more values, even to a different time out for each different suspend request. However, regardless of the suspend request source, or the time out used, eventually the system will suspend. During the suspend period, the HDD latch monitors the HDD switch and is tripped if the HDD switch is switched.

Computer system 10 resumes under a variety of conditions. For example, a resume can be triggered by the suspend/resume switch or a Modem ring. Regardless of the source of the resume request, the system follows a common path. During the resume process, the system checks the HDD latch. If the HDD latch has not been activated during suspend, then the system continues the resume process. If, however, the HDD latch has been activated during the suspend period, the system determines whether the HDD has actually been changed during this time. If the HDD has not been changed, then the system continues the normal resume process. If the HDD has been changed, then the system re-boots.

In some embodiments, computer system 10 relies upon messages to the user, and the user's responses, to determine if the HDD has actually been changed. When the system senses that the HDD latch has been activated during suspend, it first displays a message that the HDD may have been changed. The user has a choice of booting, or continuing with the resume. If the user elects to continue, then the system displays a second message. This message warns the user that resuming with a different HDD may cause data loss. Again, the user is given the choice of continuing the resume, or booting.

In other embodiments, computer system 10 automatically determines whether the HDD has been changed without user input. Most PC operating systems conventionally cause a volume label, serial number, or other unique identifier to be placed on each HDD when it is formatted. Computer system 10 checks the HDD identification when it boots and stores such information in a nonvolatile memory. Alteratively, before suspending upon removal of the HDD, the system can detect and store the HDD identifier. Then, during resume, if the HDD latch was activated during suspend, the CPU determines whether the HDD identifier has changed. If the identifier is unchanged, then the system will continue the resume process. If the identifier is different, the user will be given a choice: either boot with the new drive, or change to the correct HDD and then resume. This sequence is easier for the user to understand and does not depend upon the user to determine if the correct drive is in the system for a safe resume.

Each of the above-described features will now be described in further detail in reference to FIG. 2 and FIG. 3. Referring first to FIG. 2, the procedures performed by one embodiment of a computer system according to the present invention when a HDD is removed will be described.

As shown in step 102, CPU 12 initially receives an SMI signal from interrupt controller 26. As shown in step 104, CPU 12 then determines from interrupt controller 26, in a conventional manner, the source of the SMI signal.

If the SMI source is not the HDD switch, the system will check to see whether the SMI signal indicates that the system should be suspended, as shown in step 126. If the SMI signal does not indicate that the system is to be suspended, the system will execute other conventional SMI handlers, which are not relevant to the present invention, as illustrated in step 124. If the system determines in step 126 that a normal suspend request has occurred, then the system will implement a normal suspend and the HDD will be powered down after a predetermined period of time, as illustrated in step 128.

If the CPU determines from the interrupt controller 26 that the source of the SMI signal was the HDD switch 30, then the CPU will implement an SMI emergency suspend, and the HDD will be quickly powered down, as shown in step 106.

During both normal suspension and/or SMI emergency suspend, HDD latch 34 monitors HDD switch 30, as shown in step 108. Eventually, an SMI start/resume code is received, for example if the user presses the suspend/resume switch indicating that the user wishes the computer to resume. This is shown in step 110.

After receiving such a resume request, CPU 12 will check latch 34, as shown in step 112, to determine whether the HDD switch 30 has caused latch 34 to trip. If it has not, the system will resume, as shown in step 130. If the latch has been tripped, CPU 12 will cause a first message to be displayed to the user, as shown in step 114. This message preferably indicates that the HDD may have been changed and giving the user a choice whether to have the system boot or to continue with the resume process, a choice which may be implemented by pressing indicated function keys.

As shown in step 116, CPU 12 then determines whether a boot request has been received. If so, the system will boot, as shown in step 132. If not, the CPU causes a second message to be displayed to the user, as shown in step 118. The second message informs the user that data loss may result if the system resume and the hard drive has been replaced. This message then gives the user a choice whether to have the system boot, or to replace the hard drive, a choice which may be implemented by selecting appropriate function keys. As shown in steps 120 and 122, if a resume request is received, then the system implements a normal resume procedure. If the user instead has indicated that user wishes to replace the hard drive, CPU 12 will then return to step 106, implementing an SMI emergency suspend and powering down the HDD. In some embodiments, step 120 also provides the user with a choice to boot the system. If the user chooses to boot the system in step 120, then CPU will implement step 132.

Latch 34 is reset after the user has made a selection. Latch 34 may be reset in any conventional manner, depending on the particular latch being used.

Referring now to FIG. 3, the procedures implemented in a second embodiment of the present invention will be described. Steps 102 through 112 and 124 through 130 shown in FIG. 3 have already been described in connection with FIG. 2, and will not be repeated. The procedures shown in FIG. 3 also include new steps 202 through 210, which will be described below.

In the procedures shown in FIG. 3, if CPU 12 determines, in step 112, that the HDD latch has been tripped, then CPU 12 checks the HDD identification code (which is encoded when the disk is formatted in most operating systems) and compares the ID code with an ID code for the previously installed HDD to determine whether the HDD has been changed. If the codes are identical, then the HDD has not been changed, and the system will resume, as shown in step 204. If the HDD codes are different, then the CPU will cause a display indicating that the HDD has been changed and giving the user a choice whether to replace the current HDD with the original HDD or to cause the system to boot, as shown in step 206.

As shown in steps 208 and 210, if a boot request is received then the system will boot. If the user does not choose to boot, or indicates a desire to replace the HDD, then the system will return to step 106. The SMI emergency suspend will occur and the HDD will be powered down, allowing the HDD to be replaced safely.

As described above, computer system 10 relies upon the assumption that the user will not be able to physically remove the HDD faster than the Emergency suspend process is completed. This is generally the case. Theoretically, however if the user were fast enough, the HDD could be removed while it was still being accessed in certain embodiments. This could cause loss or corruption of data on the HDD.

An electromechanical interlock can be used to absolutely protect against this. In embodiments having an electromechanical interlock, when the HDD latch is activated, an SMI signal is immediately generated, but the HDD is not immediately released. After the system is suspended and it is safe to release the HDD, then the HDD is released. This release mechanism can be implemented in a variety of mechanical or electromechanical ways. For example, the HDD switch, when switched, can made to initially move into a first "release" state which triggers the SMI but does not physically release the HDD, and then to enter a second "release" state. An additional impediment prevents the latch from being moved to the second state, which would release the HDD, until the system is suspended. Alternatively, the HDD lock/release can be a separate mechanism which is controlled only by a signal from the system, which is sent after the user has pressed a selected switch or key indicating that the HDD is to be removed and the system has thereafter been suspended.

While the present invention has been described in connection with specific embodiments, the present invention is not limited to such embodiments and encompasses modifications and equivalent arrangements within the scope of the appended claims.

What is claimed is:

1. A computer system for use by a user without specialized knowledge in the field of computers, comprising:

a port for receiving a removable component;

a switch for mechanically locking said component to said port and releasing said component from said port, wherein said switch causes the computer system to be suspended and power to the component to be cut off when said component is released from said port, without specific instructions from the user that suspension is necessary;

a release detection system for determining whether said switch has released said component;

a replacement detection system for determining whether said component has been replaced with a different component;

a display for displaying a message if said component has been replaced while the computer system is suspended; and an input device for receiving commands from the user, wherein the computer system executes a boot procedure if said input device receives a boot request from the user, and wherein the computer system executes a suspend procedure if said input device receives a command indicating that a suspend procedure is to be performed.

2. The computer system of claim 1, wherein said component is a storage device.

3. The computer system of claim I, wherein said component is a hard disk drive.

4. The computer system of claim 1, wherein said switch causes an electrical signal to be generated when said switch releases said component.

5. The computer system of claim 4, wherein said computer system further comprises an interrupt controller, said interrupt controller being responsive to said electrical signal from said switch, wherein said interrupt controller causes the computer system to be suspended when said switch releases said component.

6. The computer system of claim 1, wherein said switch causes said component to be mechanically released from said port after the system becomes suspended.

7. A computer system, comprising:

a port for receiving a hard disk drive;

a switch for locking said hard disk drive to said port and releasing said hard disk drive from said port, wherein power to the hard disk drive is cut off without cutting off power to the entire computer system when said hard disk drive is released from said port;

a detection system for determining whether said switch has released said hard disk drive;

a replacement indicator system for determining whether said hard disk drive has been changed;

a display for displaying a message when said hard disk drive has been changed;

means for executing a boot procedure in response to input from the user indicating that a boot procedure is to be performed; and means for suspending the computer system in response to input from the user indicating that a suspend procedure is to be performed.

8. A method for controlling a computer having a port, a removable component, and a switch for securing said component to the port, said switch selectably causing said component to be locked to the port and released from the port, said method comprising the steps of:
 (a) monitoring the status of the switch when the computer is suspended to determine whether the component has been removed;
 (b) when the computer is resumed, determining whether the component has been replaced with a different component;
 (c) displaying a message to a user of the computer when the component has been replaced while the computer was suspended; and
 (d) executing, in response to a command from the user, one of a boot procedure or a suspend procedure.

9. The method of claim 8, further comprising the step of executing a resume procedure when the component has not been replaced while the computer was suspended.

10. A computer system having a removable component and a port, comprising:
 an electromechanical switch for selectably mechanically locking the component to the port and mechanically releasing the component from the port, and for generating an electrical signal that causes the computer system to be suspended when the component is mechanically released from the port;
 a detection system for determining whether the component has been released;
 means for determining whether the component has been replaced with a different component;
 a display for displaying a message to a user of the computer when the component has been replaced while the computer was suspended;
 means for executing, in response to user input, a boot procedure; and
 means for executing in response to user input, a suspend procedure.

11. A computer system, comprising:
 a port;
 a component removably coupled to the port;
 means for mechanically locking the component to the port and unlocking the component from the port;
 means for automatically causing the computer to be suspended when the component is unlocked from the port;
 a detection system for determining whether the component has been removed and replaced with a different component;
 a display for displaying a message to a user of the computer when the component has been replaced while the computer was suspended; and
 means for executing, in response to a command from the user, a boot procedure.

12. The method of claim 8, wherein the removable component is a hard disk drive.

13. The method of claim 8, wherein said switch is an electromechanical switch, said switch causing an electrical signal to be generated when said component is unlocked from the port.

14. The method of claim 11, wherein the component is a hard disk drive.

* * * * *